（12） United States Patent
Rick

(10) Patent No.: US 9,625,295 B2
(45) Date of Patent: Apr. 18, 2017

(54) DOPPLER MEASUREMENT INSTRUMENT AND DOPPLER MEASUREMENT PROCESSING METHOD

(75) Inventor: David Langley Rick, Longmont, CO (US)

(73) Assignee: Hach Company, Loveland, CO (US)

( * ) Notice: Subject to any disclaimer, the term of this patent is extended or adjusted under 35 U.S.C. 154(b) by 884 days.

(21) Appl. No.: 13/569,965

(22) Filed: Aug. 8, 2012

(65) Prior Publication Data
US 2013/0041600 A1 Feb. 14, 2013

Related U.S. Application Data

(60) Provisional application No. 61/521,158, filed on Aug. 8, 2011.

(51) Int. Cl.
*G01F 1/66* (2006.01)
*G01F 1/00* (2006.01)

(52) U.S. Cl.
CPC ............. *G01F 1/663* (2013.01); *G01F 1/002* (2013.01)

(58) Field of Classification Search
CPC .......... G06F 19/00; G01F 23/00; G01F 1/663; G01F 1/002
USPC ............................................... 702/45, 50, 51
See application file for complete search history.

(56) References Cited

U.S. PATENT DOCUMENTS

| 5,371,686 A | 12/1994 | Nabity |
| 5,421,211 A * | 6/1995 | Heckman ................ G01F 1/002 73/861.23 |
| 5,633,809 A | 5/1997 | Wissenbach |
| 6,408,699 B1 | 6/2002 | Moss et al. |
| 6,505,131 B1 * | 1/2003 | Henrot .................. G01F 1/8413 702/45 |
| 2003/0025486 A1 | 2/2003 | Ellis |
| 2004/0249284 A1 * | 12/2004 | Vilkomerson ................ 600/453 |
| 2009/0222472 A1 * | 9/2009 | Aggarwal et al. ............ 707/102 |
| 2009/0264766 A1 * | 10/2009 | Keilman et al. .............. 600/457 |
| 2013/0041599 A1 * | 2/2013 | Rick ............................... 702/45 |

FOREIGN PATENT DOCUMENTS

CN     101605001 A    * 12/2009

OTHER PUBLICATIONS

H. Ma et al, "The Applicationof Zoom FFt Technique to the Extraction of Fault Character of Induction Motor.", 2008 International conference on condition Monitoring and Diagnosis, Beijing, China, Apr. 21-24, 2008.*
European Search Report for Application No. EP12179694, Feb. 11, 2013, 1 page, Munich, Germany.

* cited by examiner

*Primary Examiner* — Mohamed Charioui
*Assistant Examiner* — Catherine Rastovski
(74) *Attorney, Agent, or Firm* — Ference & Associates LLC

(57) ABSTRACT

A fluid flow measurement instrument is provided. The measurement instrument includes a sensor producing a time domain signal representative of reflections of an emitted signal; and a meter being coupled to the sensor and configured to: receive the time domain signal; create two or more spectral estimates for the time domain signal, wherein said two or more spectral estimates have different frequency ranges and resolutions; determine a frequency offset value using one or more of the two or more spectral estimates; and convert the frequency offset value into a fluid velocity. Other aspects are described and claimed.

15 Claims, 11 Drawing Sheets

DOPPLER MEASUREMENT INSTRUMENT AND DOPPLER MEASUREMENT PROCESSING METHOD

This application claims priority to U.S. provisional patent application 61/521,158, entitled "DOPPLER MEASUREMENT INSTRUMENT AND DOPPLER MEASUREMENT PROCESSING METHOD", filed on Aug. 8, 2011, which is incorporated by reference herein.

BACKGROUND

Instruments exist which measure fluid velocity by frequency based measuring (Doppler), for example by emitting an ultrasonic or microwave carrier signal that echoes off targets such as particulate matter, air bubbles, etc., carried in a flowing liquid and returns with its mean frequency shifted by the Doppler Effect. Common usage for such instruments is in the measurement of open-channel flow, as for instance in a wastewater collection sewer. Instruments of this type estimate fluid velocity from the observed Doppler frequency shift.

The Doppler shift can comprise a shift in a frequency of the reflected signal versus the originally transmitted signal, due to motion of an object toward or away from the Doppler transmitter device. The Doppler shift can be subsequently processed to determine the velocity. Further, the change in frequency of the reflected signal can be used to determine the direction of motion of the object, either toward or away from the Doppler measurement device.

In the measurement of fluid flow, a Doppler shift can be measured using continuous or pulsed waves transmitted through the fluid in order to detect a fluid velocity. Consequently, the waves can be transmitted from within the fluid, including parallel to or at an angle from the fluid surface.

Various methods exist for processing of the returned signal, but most involve some type of spectral analysis. Typically, the normalized power spectral density (PSD) of the returned signal is used as a surrogate for the probability density function (PDF) that describes individual particle velocities. In some instruments, the magnitude spectrum of the returned signal is used instead of the power spectrum. Both the magnitude spectrum and the power spectrum are examples of a velocity spectrum. The velocity spectrum is then used to estimate mean velocity, peak velocity, maximum-likelihood velocity, or some other statistic that is relevant to the flow.

One method of Doppler processing converts frequency values into digital values and uses a Fast Fourier Transform (FFT) to convert the time domain signals into the frequency-domain. The frequency-domain will include a strong Doppler measurement response amplitude in one or more frequency bins, representing the Doppler shift in the reflection from the fluid. The amount of Doppler shift in a reflection depends on the velocity of the target from which it is reflected. Consequently, a large fluid velocity will result in a large shifted distance from the carrier frequency. A velocity spectrum produced by the FFT processing will typically generate two obvious peaks. One peak is associated with the non-Doppler-shifted carrier wave energy. The carrier wave energy is present in the return signal due to some combination of crosstalk and reflection from stationary objects, such as a flow channel boundary or other boundary surface. In an instrument producing a two-sided velocity spectrum, this is the central peak. In an instrument producing a one-sided velocity spectrum, this is typically the left-most peak. The carrier peak will often be the highest peak in the velocity spectrum and will be comparatively narrow. The other peak will represent the measurement reflection obtained from and representative of the fluid flow. The location of this Doppler reflection peak relative to the carrier wave peak will depend on the speed and direction of the fluid flow. A faster fluid flow will be located farther from the carrier wave peak. In instruments producing a two-sided velocity spectrum, the location of the Doppler reflection peak with regard to the carrier wave peak will indicate the flow direction. In such instruments, a peak location to the right of the carrier position will indicate one flow direction, and a peak location to the left of the carrier position will indicate the opposite flow direction. Instruments producing one-sided velocity spectra do not distinguish the flow direction because they allow spectral components from one side of the carrier position to be aliased or mirrored to the other side. These "one-sided" Doppler instruments can measure the velocity magnitude, but not its sign.

BRIEF SUMMARY

In summary, one aspect provides a fluid flow measurement instrument, comprising: a sensor producing a time domain signal representative of reflections of an emitted signal; and a meter being coupled to the sensor and configured to: receive the time domain signal; create two or more spectral estimates for the time domain signal, wherein said two or more spectral estimates have different frequency ranges and resolutions; determine a frequency offset value using one or more of the two or more spectral estimates; and convert the frequency offset value into a fluid velocity.

Another aspect provides a fluid flow measurement method, comprising: producing a time domain signal representative of reflections of an emitted signal via a sensor; and receiving at a meter the time domain signal; creating with the meter two or more spectral estimates for the time domain signal, wherein said two or more spectral estimates have different frequency ranges and resolutions; determining with the meter a frequency offset value using one or more of the two or more spectral estimates; and converting with the meter the frequency offset value into a fluid velocity.

A further aspect provides a program product for fluid flow measurement, comprising: a device readable program storage device storing device readable program code, the device readable program code comprising: device readable program code configured to produce a time domain signal representative of reflections of an emitted signal via a sensor; and device readable program code configured to receive at a meter the time domain signal; device readable program code configured to create with the meter two or more spectral estimates for the time domain signal, wherein said two or more spectral estimates have different frequency ranges and resolutions; device readable program code configured to determine with the meter a frequency offset value using one or more of the two or more spectral estimates; and device readable program code configured to convert with the meter the frequency offset value into a fluid velocity.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION OF THE INVENTION

Figure 1:
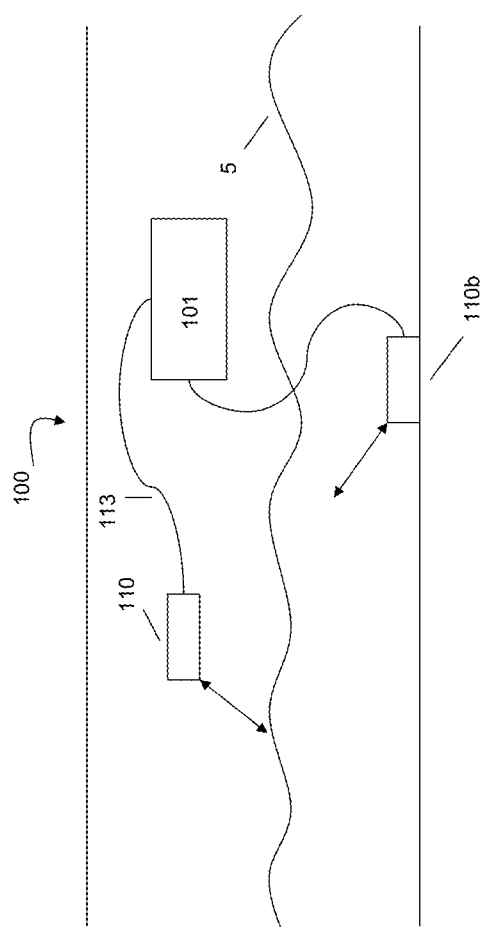
FIG. 1 shows an example Doppler measurement instrument.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

One problem encountered in the prior art is measurement range, computation time, and signal processing considerations. A Doppler instrument will have a maximum measurable Doppler shift in inverse proportion to the Doppler resolution of the instrument. In conventional Doppler flow velocity instruments, accurate and repeatable measurement of a low fluid velocity requires a measurement of long duration in time in order to distinguish reflected frequencies that are close together. Conversely, a high fluid flow rate requires a rapid sampling rate in order to permit a large span of possible frequencies. A combination of long time duration and rapid sampling rate may require excessive memory and processing time. Consequently, a conventional Doppler instrument capable of accurately measuring high fluid velocities may not be sufficiently accurate for measuring low fluid velocities because its rapid sampling rate precludes analyzing data from a sufficiently long time duration. Conversely, a conventional Doppler instrument capable of accurately measuring low fluid velocities may consequently either have a limited velocity measurement range or require excessive memory and processing time.

In a conventional flow measurement system using submerged ultrasonic transducers to obtain a Doppler-shifted return signal, the system first employs a fast sample rate to enable a wide frequency span. Based on this initial spectrum, it may adaptively lower the sample rate to obtain a lower frequency span and finer frequency resolution. It then acquires new samples and processes a second FFT having a span and resolution appropriate to measure the fluid velocity estimated from the first FFT. This two step process takes additional time and wastes energy. The hardware required to implement variable filtering and sampling in two signal phases (I and Q) is complex.

FIG. 1 shows an example Doppler measurement instrument 100 according to an embodiment. The Doppler measurement instrument 100 includes a zoomed architecture in some embodiments. The Doppler measurement instrument 100 includes a zoomed spectral analysis architecture in some embodiments. The zoomed spectral analysis architecture enables accurate and reliable measurement of target velocity including very small target velocities and very large target velocities. This accurate and reliable measurement over a large velocity range is an improvement over prior approaches.

The Doppler measurement instrument 100 according to any of the embodiments simultaneously processes samples at multiple sample rates. This enables a wide velocity measurement span simultaneously with high resolution at lower velocities. The Doppler measurement instrument 100 according to any of the embodiments can have a very simple single-phase hardware signal path.

The Doppler measurement instrument 100 in the example embodiment illustrated comprises a meter 101 and a sensor 110 coupled to the meter 101, for example by cabling 113. The meter 101 and sensor(s) 110, 110b may also be connected via a wireless communication mechanism. As a result, the sensor 110 can be independent from and remote from the meter 101. The Doppler measurement instrument 100 may include multiple sensors 110. Alternatively, the sensor 110 can be integrated into the meter 101. The sensor 110 interacts with the fluid 5 in order to generate a representative electronic measurement signal. The meter 101 receives and processes measurement signals, such as digitized measurement signals, from the sensor 110 in order to generate target velocity measurements, such as fluid velocity measurements.

The Doppler measurement instrument 100 is constructed to accommodate and measure a wide range of target velocities. The sensor 110 directs energy toward the fluid 5 in order to measure the fluid velocity. The Doppler measurement instrument 100 may include a submerged sensor 110b. The submerged sensor 110*b* can be configured and positioned to remain submerged in the fluid 5 most or all of the time.

One application for Doppler measurement instrument 100 is in generating a volume flow rate of fluid flow in a channel. The water can be flowing in an open channel or in a closed channel.

The Doppler measurement instrument 100 may comprise an independent device in some embodiments. Alternatively, the Doppler measurement instrument 100 may be integrated into another device, such as in a fluid flow rate sensor, for example, where the target velocity measurement is used for determining a fluid flow rate using the velocity and other factors, such as a fluid depth and flow cross-sectional area.

Target velocity measurement presents difficulties. One difficulty is in accurately measuring a wide range of target velocities. When the target has a limited velocity range, then the measurement of the target velocity is relatively easy. However, this is often not the case. Where the target velocity can vary widely, the target velocity measurement can be problematic, and an instrument suitable for installation in a wide variety of sites must support a wide velocity measurement range.

The frequency resolution of any spectral analysis system is proportional to the length of the time series it analyzes. In a digital spectral analysis system operating at a fixed sample rate, the frequency resolution will be proportional to the number of data samples processed.

Figure 2:
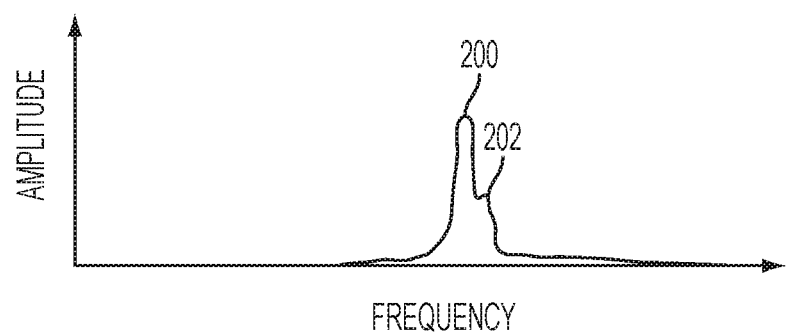
FIG. 2 shows an example of a Doppler-shifted measurement for a low target velocity.

FIG. 2 shows an example of a Doppler-shifted measurement for a low target velocity. The Doppler-shifted reflection 202 is very close to a carrier wave frequency 200. Because the target velocity is small, the Doppler frequency shift (i.e., the reflected carrier wave signal, now shifted in frequency) will be correspondingly small. Discriminating this closely-spaced Doppler-shift signal 202 from the carrier wave 200 will require a fine frequency resolution, but will not require a large span of frequencies.

Figure 3:
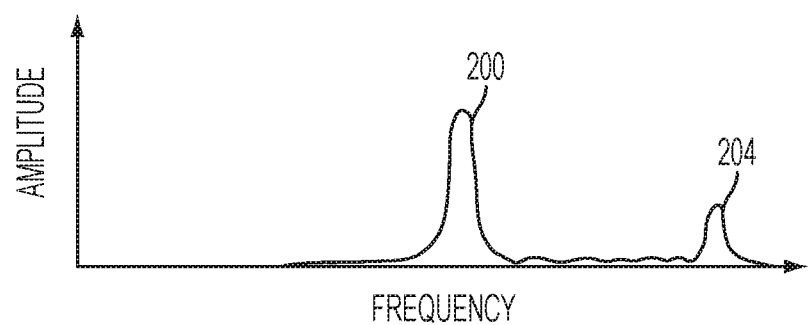
FIG. 3 shows an example of a Doppler-shifted measurement for a high target velocity.

FIG. 3 shows an example of a Doppler-shifted measurement for a high target velocity. The Doppler-shifted reflection 204 is relatively far from the carrier wave frequency 200. Consequently, the signal processing will need to encompass a relatively large frequency span. A small frequency resolution capability will require a huge number of samples for this example. A huge number of samples will in turn require a large amount of computational time in order to process the received signal and determine the distance from the carrier wave frequency to the Doppler reflection frequency.

Where a velocity sensor is constructed to resolve small frequency shifts (i.e., low velocities) in an accurate manner, the velocity sensor will require long computational times for processing and resolving large frequency shifts (i.e., high velocities). Consequently, the velocity measurement should be capable of searching a large frequency span for accurately measuring high target velocities, while yet possessing a fine scale frequency resolution for accurately measuring low target velocities.

The carrier wave 200 can be chosen to accommodate the expected target velocities. For example, where the carrier wave frequency is 1 MegaHertz (MHz), then a resulting Doppler shift may be about 383 Hz in change per change in 1 foot-per-second (fps) in measured velocity. A desired resolution of measuring a 0.01 fps change in target velocity will require the velocity sensor to be able to discriminate a change in frequency of less than 4 Hz for a 1 MHz carrier frequency. Accordingly, it is common for Doppler flow meters to down-convert the received signal to a lower frequency position prior to analysis. Typically, this is done by use of a hardware mixer or modulator. Such down-converting may employ a pair of mixers to produce quadrature (I and Q) analysis signals at a lower frequency.

A simplifying feature of the Doppler measurement instrument 100 is that the Doppler measurement instrument 100 does not process a Doppler measurement signal using separate phases. Instead, the Doppler measurement instrument 100 processes the measurement signal as a single phase. The Doppler measurement instrument 100 does not require separate In-phase and Quadrature (I and Q) channels.

A feature of the Doppler measurement instrument 100 is that the Doppler measurement instrument 100 does not employ a hardware mixer. Instead, the Doppler measurement instrument 100 employs a single high-speed Analog-to-Digital Converter (ADC) that digitizes the received Doppler measurement signal in its original spectral position (i.e., about the 1 MHz carrier wave frequency in the example embodiment discussed above). Neither does the Doppler measurement instrument 100 employ a mixing step in software. The Doppler measurement instrument 100 subsequently reduces the sample rate in software through decimation. But the Doppler measurement instrument 100 does not simply decimate the Doppler measurement signal. Instead, the Doppler measurement instrument 100 performs successive decimations using a decimation chain, generating a plurality of measurement signal versions. These successively-decimated signal versions are processed to determine the frequency shift of the Doppler measurement signal from the carrier wave frequency. The plurality of successively-decimated measurement signal versions comprise a plurality of sampling rates of the original Doppler measurement signal. The plurality of successively-decimated measurement signal versions comprise a plurality of frequency resolution versions of the original Doppler measurement signal.

Figure 4:
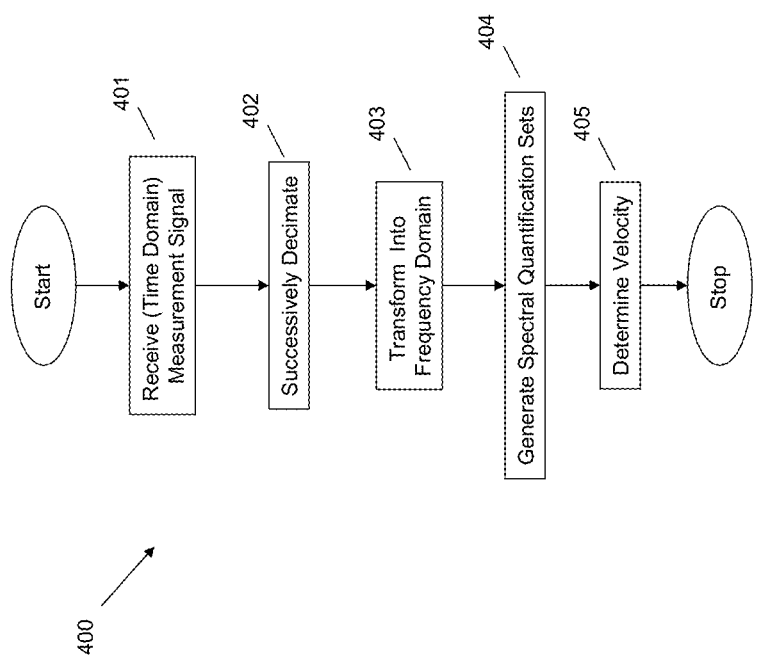
FIG. 4 is an example flowchart of a Doppler measurement processing method.

FIG. 4 is a flowchart 400 of a Doppler measurement processing method according to an embodiment. The Doppler measurement processing method processes a Doppler measurement signal and generates a velocity measurement from Doppler-shifted target reflection or reflections in the Doppler measurement signal. The velocity measurement is related to a Doppler frequency shift in a reflection or reflections of an emitted carrier wave.

In step 401, the Doppler measurement signal is received. The Doppler measurement signal can comprise a digitized Doppler measurement signal. The Doppler measurement signal can be buffered or amplified. The Doppler measurement signal can be filtered or otherwise conditioned to remove noise and/or undesired components. Further, the Doppler measurement signal can be digitized. The digitizing can be at a relatively high sampling rate in order to avoid aliasing, for example. The digitizing can create more samples than are needed.

In step 402, the Doppler measurement signal is successively decimated. The successive decimation can be performed using a decimation chain of serially linked decimation stages, such as a chain of analysis scale decimation stages. The first decimation stage receives the Doppler measurement signal and performs a first decimation operation, outputting a once-decimated Doppler measurement signal. Each subsequent decimation stage after the first decimation stage receives an already decimated version of the original Doppler measurement signal. Consequently, the output of the second decimation stage comprises the twice-decimated Doppler measurement. Consequently, the sampling rate (and therefore the number of samples) in the Doppler measurement signal is successively reduced by the successive decimation, generating a plurality of successively-decimated analysis scale signal sets. Each set of the plurality of successively-decimated analysis scale signal sets comprises a decimated version of the Doppler measurement signal (see FIG. 5 and the accompanying discussion below). Each successively-decimated analysis scale signal set may contain some or all of the Doppler reflection information.

In step 403, the plurality of successively-decimated analysis scale signal sets are transformed into the frequency domain to produce a plurality of frequency-domain signal sets. The transformation can be accomplished in any manner. For example, the transformation can be achieved using a Discrete Fourier Transform (DFT) or Fast Fourier Transform (FFT). However, other methods or algorithms may be employed.

Each frequency-domain signal set of the plurality of frequency-domain signal sets comprises a frequency-domain version of a corresponding decimated signal version. Each frequency-domain signal set therefore comprises a set or array of frequency bins that are representative of predetermined frequencies or frequency bands and that extend over a predetermined frequency range. Each frequency-domain signal set contains at least a portion of the possible Doppler reflection information.

The plurality of frequency bins can be processed in order to determine signals of interest in the Doppler measurement signal. The plurality of frequency bins can be processed in order to determine the location of the carrier wave. The plurality of frequency bins can be processed in order to determine the frequency location of a Doppler-shifted reflection. The plurality of frequency bins therefore can be processed in order to determine a Doppler reflection offset value comprising a frequency offset between a Doppler-shifted reflection and the carrier wave. This offset value may be a mean frequency offset value or it may be a most probable frequency offset value. Other frequency offset statistics are possible and are known to those skilled in the art. The plurality of frequency bins can be processed in order to determine a target velocity from the Doppler reflection offset value. The plurality of frequency bins can be processed in order to determine a fluid flow direction (e.g., toward the Doppler sensor if the Doppler-shifted reflection is to the right of the carrier wave on the velocity spectrum and away from the Doppler sensor if the Doppler-shifted reflection is to the left of the carrier wave).

In step 404, the plurality of frequency-domain signal sets are processed to generate a plurality of spectral quantification sets, these being two or more spectral estimates or characterizations of the time domain signal. The spectral quantification sets may have different frequency ranges and resolutions. For example, a spectral quantification set may comprise a digital representation where a frequency range of interest is subdivided into a plurality of bins. Each bin may hold a magnitude value or may hold a power value. A spectral quantification set in some embodiments comprises a plurality of power spectral density (PSD) quantifications for a particular frequency-domain signal set. The plurality of spectral quantification sets in some embodiments can be further processed to generate a plurality of spectral centroids. The spectral quantification sets may alternatively be generated directly or indirectly from the decimated analysis signal sets.

The number of spectral centroids can correspond to the number of spectral quantification sets in some embodiments. Alternatively, a "zoomed centroid" may be generated from the spectral quantification sets. The zoomed centroid can be based on spectral information from some or all of the spectral quantification sets. The zoomed centroid may be formed as a synthesis or combination of the spectral quantification sets. The zoomed centroid may comprise an average or mean of selected portions of multiple spectral quantification sets in some embodiments. The zoomed centroid may comprise a centroid of the selected spectral quantification sets in some embodiments.

The use of the power spectral density may be preferred for the case of a multitude of spatially distributed Doppler targets. For example, the representative amplitude values in each frequency-domain signal set can comprise values that represent the energy content in each frequency bin. Representative amplitude values can be generated by generating a power spectral density (PSD) value for each frequency bin. The resulting plurality of PSD values can be then processed to determine a spectral centroid, wherein the value of the spectral centroid comprises the mean frequency of the Doppler-shifted reflections.

The plurality of spectral centroids for the plurality of frequency-domain signal sets can be further processed to obtain a final Doppler reflection offset value. In one embodiment, the Doppler reflection value is chosen from among the various spectral centroid values.

The choice may be made by ranking and/or scoring the centroid values according to characteristics of the spectral quantification sets from which they are derived. The ranking may be based upon which spectral quantification sets are judged most useful, accurate, and/or reliable. Consequently, the spectral quantification sets may be evaluated and the spectral quantification sets that comprise outliers, or that are anomalous in some manner, may generate lower rankings. The Doppler reflection offset value may then be chosen as the spectral centroid value having the highest ranking.

The ranking of the spectral centroid values may be based on one or more characteristics of the spectral quantification sets. Some example characteristics are: peak to mean energy ratio, peak width, and spectral asymmetry about the carrier position. Many other characteristics are possible, and are known to those skilled in the art.

In another embodiment, the Doppler reflection offset value is derived from the zoomed centroid value. The Doppler reflection offset value comprises a frequency offset between a Doppler-shifted reflection and the carrier wave, as discussed above. The processing therefore comprises determining a best Doppler reflection frequency offset value from the plurality of frequency-domain signal sets.

In step 405, the Doppler reflection offset value is used to determine a velocity value. Where the Doppler measurement signal is a measurement signal used to detect a target velocity, the Doppler reflection offset value is used to produce a target velocity measurement. However, it should be understood that the produced velocity measurement might comprise any manner of velocity measurement obtained through use of a Doppler frequency-shift in a reflected signal. For example, the measurement may comprise a statistical average velocity, rather than the velocity of any particular target.

Figure 5:
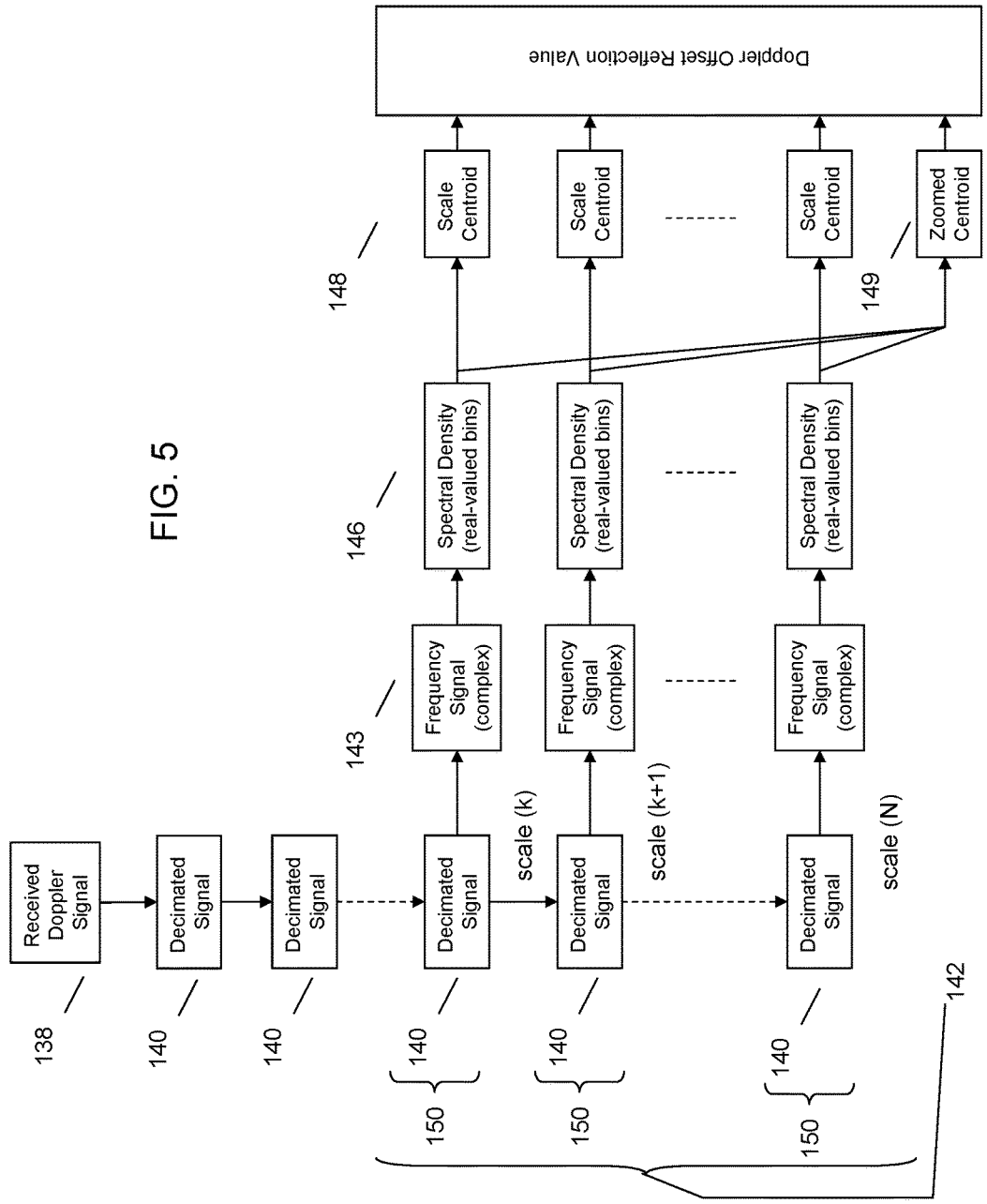
FIG. 5 is an example data flow diagram showing the conversion of the Doppler measurement signal into multiple other sets.

FIG. 5 is a data flow diagram showing the conversion of the Doppler measurement signal into multiple other sets during the Doppler measurement processing method. The top level is the single Doppler measurement signal 138 as it is received. Although the velocity measurement may likely produce an essentially continuous stream of measurements, these measurements are here presumed to be in the form of a sequence of discrete digital samples. The Doppler measurement signal 138 can comprise a response waveform or group of samples. For example, the Doppler measurement sensor can periodically emit a pulse of waveform energy and capture any reflected energy.

The next level comprises a plurality of signal decimation stages 140, where the received Doppler measurement signal 138 is successively decimated, as previously discussed. The decimation has the effect of reducing the sampling rate (see FIG. 7). Any number of signal decimation stages 140 may be employed and the Doppler measurement signal 138 may be decimated to a multiplicity of predetermined sample rates.

One or more analysis scale decimation stages 142 follow the signal decimation stages 140. The one or more analysis scale decimation stages 142 decimate the signal between each analysis scale 150. As a result, the decimation provided by the one or more analysis scale decimation stages 142 produces a plurality of analysis scales k, k+1, k+2, . . . N.

The next level comprises a number of frequency-domain signal sets 143. The frequency-domain signal sets 143 are produced by transforming the decimated signals from the time domain into the frequency domain. Each frequency-domain signal set 143 comprises a plurality of frequency bins. Each bin value may be a complex number comprising real and imaginary parts.

The next level comprises a corresponding number of spectral quantification sets 146 or spectral bin values. In the embodiment shown, the plurality of spectral quantification sets 146 comprises a plurality of power spectral density (PSD) sets 146. It should be understood that other spectral quantification sets are contemplated and are within the scope of the description. Spectral quantification bin amplitudes are typically real-valued.

As discussed above, each frequency-domain signal set 143 comprises a plurality of frequency bins. These frequency bins are processed to generate a PSD value for each frequency bin. A PSD value of a frequency bin comprises a power content of that frequency bin. Consequently, the number of PSD values corresponds to the number of frequency bins. A PSD value in some embodiments is generated by taking the magnitude of the complex value of the frequency bin and squaring the magnitude value.

The next level comprises a plurality of analysis scale spectral centroids 148 corresponding to the spectral quantification sets 146, one per each frequency-domain signal set 143. A spectral centroid 148 is generated for a corresponding frequency-domain signal set 143 by processing the plurality of PSD values 146 of the frequency-domain signal set 143. The resulting plurality of spectral centroids 148 therefore is representative of the location of the mean Doppler shift in a frequency-domain signal set 143.

A zoomed centroid 149 is formed from spectral quantification sets 146. The zoomed centroid 149 includes information from one or more spectral quantification sets 146. The zoomed centroid is based on multiple bin amplitudes, with different bin ranges coming from different scales.

The result is a Doppler reflection offset value 152. The Doppler reflection offset value 152 is produced from the plurality of spectral centroids, as previously discussed. The Doppler reflection offset value 152 may comprise a selection of a most representative spectral centroid from among the plurality of spectral centroids 148. Alternatively, the Doppler reflection offset value 152 may comprise a synthesis of the plurality of the spectral quantification sets, such as that provided by the zoomed centroid 149. The Doppler reflection offset value 152 can be subsequently used to generate a velocity measurement value.

Figure 6:
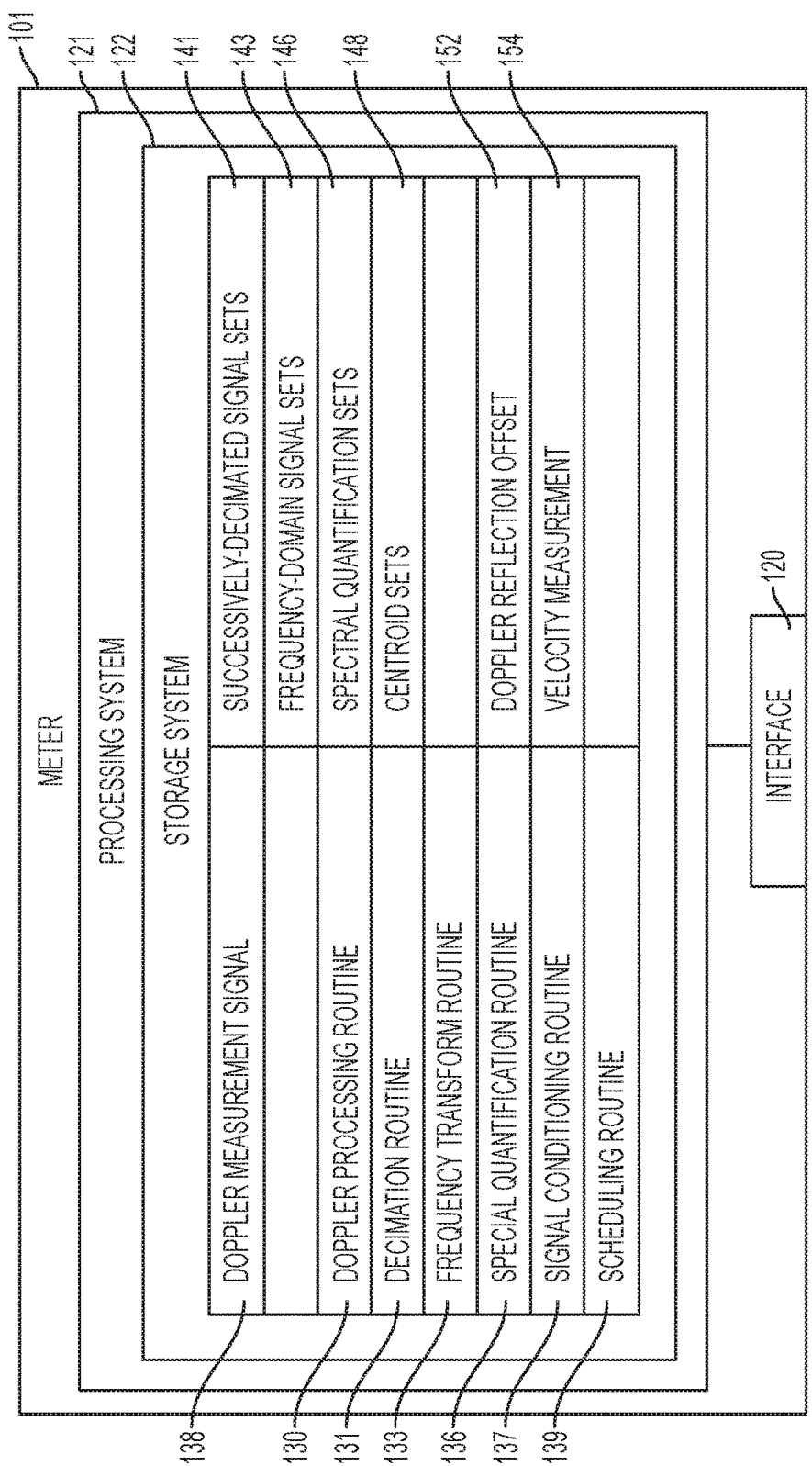
FIG. 6 shows an example meter of the Doppler measurement instrument.

FIG. 6 shows the meter 101 of the Doppler measurement instrument 100 according to the invention. The meter 101 includes an interface 120, a processing system 121 in communication with the interface 120, and a storage system 122 in communication with the processing system 121. Although these components are shown as distinct blocks, it should be understood that the meter 101 can be comprised of various combinations of integrated and/or discrete components.

The interface 120 is configured to communicate with the sensor 110 of the Doppler measurement instrument 100. The interface 120 may be configured to receive Doppler measurement signals from the sensor 110. The interface 120 may be further configured to communicate with external devices and/or with a technician or operator, such as for data downloads, system maintenance, inspection, re-programming, or other operations.

The processing system 121 can comprise any manner of processing system. The processing system 121 is configured to retrieve and execute stored routines in order to operate the meter 101.

The storage system 122 can store routines including a Doppler processing routine 130, a decimation routine 131, a frequency transform routine 133, a power quantification routine 136, a signal conditioning routine 137, and a scheduling routine 139. Other measurement/processing routines are contemplated and are within the scope of the description.

The storage system 122 can store measurements, received values, working values, and other information. In some embodiments, the storage system 122 stores a Doppler measurement signal 138 (or a sample or portion thereof), a plurality of successively-decimated analysis scale signal sets 141, a plurality of frequency-domain signal sets 143, a plurality of spectral quantification sets 146, and a plurality of centroid sets 148. Further, the storage system 122 can store a produced Doppler reflection offset value 152 and a produced velocity measurement 154. Other values are contemplated and are within the scope of the description.

The Doppler processing routine 130 can process received Doppler measurement signals and generate velocity measurements. The velocity measurements can comprise substantially instantaneous measurement values or can comprise periodic velocity measurement values. The Doppler processing routine 130 in some embodiments comprises an overall processing routine and can execute other routines.

In some embodiments, the processing system 121 is configured to execute the signal conditioning routine 137. In some embodiments, the signal conditioning routine 137 is configured to operate on the plurality of successively-decimated analysis scale signal sets 141 and condition the digitized signals therein. The signal conditioning routine 137 can perform appropriate filtering, such as band-pass or notch filtering, for example. The signal conditioning routine 137 can perform windowing in order to reduce side lobe levels in the frequency-domain signal set, for example.

In some embodiments, the processing system 121 is configured to execute the decimation routine 131. In some embodiments, the decimation routine 131 is configured to decimate the received Doppler measurement signal 138. In some embodiments, the decimation routine 131 is configured to successively decimate the received Doppler measurement signal 138 and generate the plurality of successively-decimated analysis scale signal sets 141.

In some embodiments, the processing system 121 is configured to execute the frequency transform routine 133. In some embodiments, the frequency transform routine 133 is configured to operate on the plurality of successively-decimated analysis scale signal sets 141 and transform the time-domain signals therein in order to generate the plurality of frequency-domain signal sets 143.

In some embodiments, the processing system 121 is configured to execute the spectral quantification routine 136. In some embodiments, the spectral quantification routine 136 is configured to operate on the plurality of frequency-domain signal sets 143 and generate power spectral densities (PSDs) for each frequency-domain signal set or spectral quantification routine 136 is configured to operate on the plurality of frequency-domain signal sets 143 and generate magnitude spectral densities for each frequency-domain signal set. The spectral quantification routine 136 generates the plurality of spectral quantification sets 146. The spectral quantification sets may be magnitude spectral density or power spectral density quantification sets.

In some embodiments the spectral quantification sets 146 may be generated directly from successively decimated analysis scale signal sets 141 by means of a non-transform-based spectral estimation method. Non-transform-based spectral estimation methods are known to those skilled in the art, and include various parametric spectral estimation methods. In such embodiments, frequency-domain signal sets 143 may not be computed, and the frequency transform routine 133 and power quantification routine 136 may be replaced by a routine which inputs decimated analysis scale signal sets 141 and outputs spectral quantification sets 146 directly. The various spectral quantification sets may be generated using different spectral estimation methods.

In some embodiments, the Doppler processing routine 130, when executed by the processing system 121, is configured to successively decimate a Doppler measurement signal 138 to generate a plurality of successively-decimated analysis scale signal sets 141, transform the plurality of successively-decimated analysis scale signal sets 141 into a corresponding plurality of frequency-domain signal sets 143, process the plurality of frequency-domain signal sets 143 in order to generate a corresponding plurality of spectral quantification sets 146, and process the plurality of spectral quantification sets 146 to generate a Doppler reflection offset value 152 for the Doppler measurement signal 138, where the Doppler reflection offset value 152 corresponds to a target velocity statistic.

In some embodiments, the processing system 121 is configured to execute the scheduling routine 139. The scheduling routine 139 may schedule meter measurements. The measurements may not necessarily be continuous in nature and may be performed periodically and/or intermittently.

Figure 7:
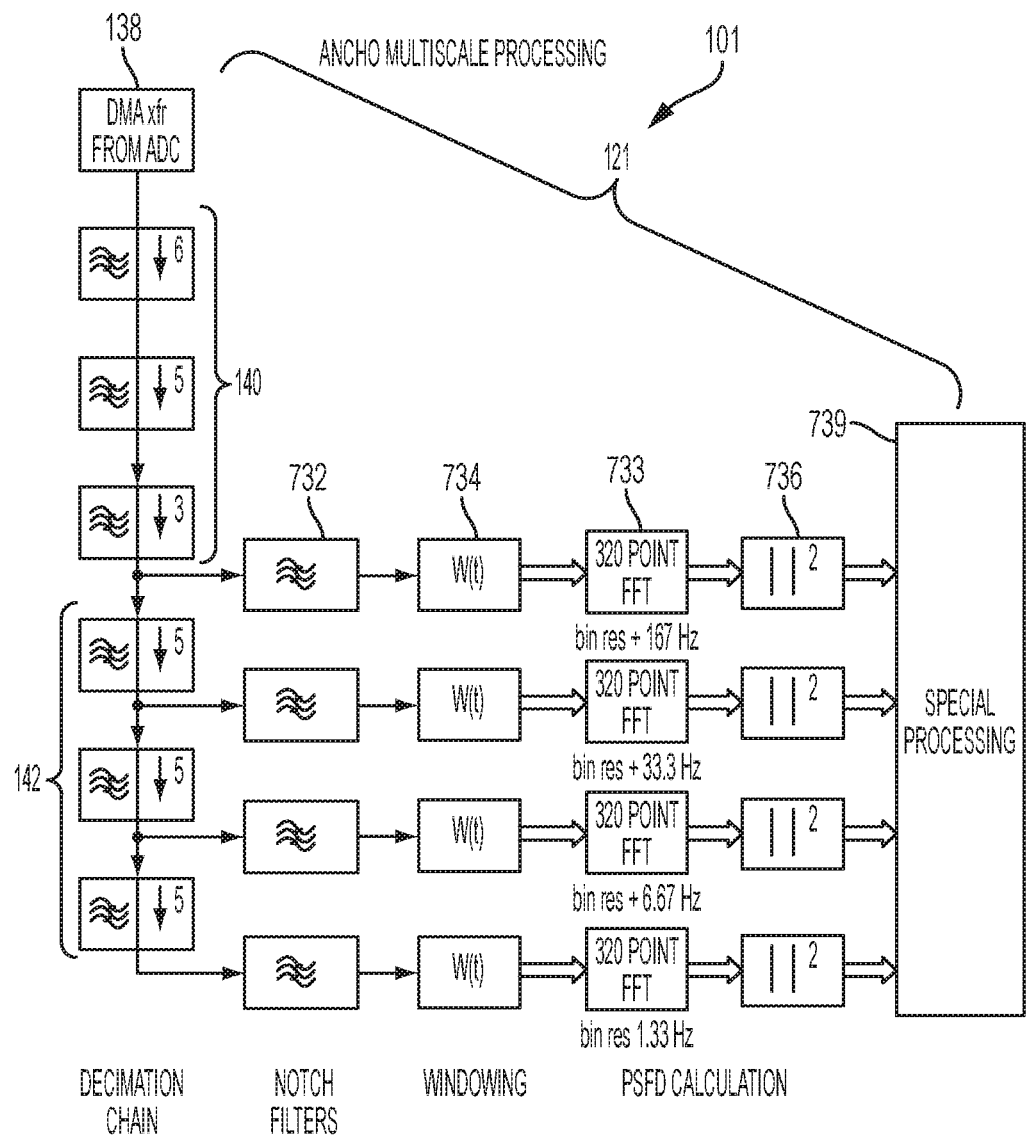
FIG. 7 shows an example meter of the Doppler measurement instrument.

FIG. 7 shows the meter 101 of the Doppler measurement instrument 100 according to the invention. The figure shows processing blocks that may be implemented in the processing system 121. Alternatively, at least some of the processing blocks may be implemented in discrete components or in subsystems external to the processing system 121.

At the top of the figure, the meter 101 receives the digitized Doppler measurement signal 138, such as from an analog-to-digital converter (ADC) 730. The ADC 730 may be part of or external to the processing system 121. The Doppler measurement signal 138 can have already been conditioned to make it ready for processing. As previously discussed, the Doppler measurement signal 138 can be pre-filtered before processing.

A two-sided bandwidth in some embodiments may be chosen to accommodate a Doppler spectrum. Such a Doppler spectrum will typically occupy at most 13 kHz on each side of a 1 MHz carrier when measuring a target velocity. This includes a guard band beyond the 10 kHz analysis range. If there are no other signals present, the sampling theorem dictates that for the two-sided signal in this example, the minimum usable sample rate is greater than 26 thousand samples-per-second (ksps). But in order to use so low a sample rate, any out-of-band noise or interference signals will be filtered out prior to digitizing. Such a narrow band filter can be difficult to build.

A second-order bandpass anti-alias filter with a 26 kHz bandwidth and a center frequency of 1 MHz provides a Q of 38, or a fractional bandwith of 2.6%. If such a filter is built with standard tolerance components, it is difficult to assure that the passband is properly centered at 1 MHz. Component variations might cause the filter's passband to miss the received Doppler spectrum entirely. Moreover, there is no guarantee that a second-order anti-alias filter is adequate.

For these reasons, in some embodiments the Doppler measurement instrument 100 may be configured to oversample (such as at about 4.8 MHz) and performs the filtering in software, where it can be precisely controlled. If this is done, only an analog low-pass filter is required in hardware. The analog anti-alias filter can comprise a monolithic low-pass filter, such as a seventh order elliptic filter with a 2.3 MHz passband, for example. Other anti-aliasing filters are contemplated and are within the scope of the description. The anti-aliasing filter may be chosen to have a stopband that is down by more than 40 dB at 3.8 MHz, where the first alias from 4.8 MHz sampling will substantially overlap the Doppler spectrum.

The Doppler measurement signal 138 may be received in one or more signal decimation stages 140. The signal decimation stages 140 may be accomplished in either hardware or software. The signal decimation stages 140 perform successive decimation of the Doppler measurement signal 138. The signal decimation stages 140 are coupled to the ADC 730 and can include a predetermined number of stages. It should be understood that signal decimation stages 140 are optional and are not necessarily required (or can be replaced by other hardware or methods for down-converting the digital measurement signal). The meter 101 in the embodiment shown includes three signal decimation stages 140 to reduce the sampling rate.

One or more analysis scale decimation stages 142 receive the Doppler measurement signal 138. The analysis scale decimation stages 142 may be accomplished in either hardware or software. As discussed above, the Doppler measurement signal 138 may or may not have already passed through signal decimation stages 140. The one or more analysis scale decimation stages 142 decimate the signal between each analysis scale. The decimation provided by the one or more analysis scale decimation stages 142 produces a plurality of analysis scales, as previously discussed.

The meter 101 may include filter stages 732 coupled to the one or more analysis scale decimation stages 142. The filter stages 732 are employed to reduce noise and/or interference in the successively-decimated analysis scale signal sets. For example, notch filters may be centered at a band of interest to reduce the carrier amplitude. However, it should be understood that other filter stages 732 can be used, such as bandpass filters, for example.

The meter 101 may include window stages 734 coupled to the filter stages 732. The window stages 734 are employed to perform windowing on the plurality of successively-decimated analysis scale signal sets to further reduce unwanted components. The windowing performs time-domain tapering in order to reduce side lobe levels. The window stages 734 may follow the filter stages 732.

The meter 101 includes frequency transform stages 733 coupled to the window stages 734. The frequency transform stages 733 are employed to transform the plurality of decimated signal sets into frequency domain signal sets. The frequency transform stages 733 in some embodiments transform the successively-decimated analysis scale signal sets using a plurality of Fourier Transforms, such as Discrete Fourier Transforms (DFTs). However, it should be understood that other transforms are contemplated and are within the scope of the description and claims. The frequency transform stages 733 create a plurality of frequency-domain signal sets from the plurality of successively-decimated analysis scale signal sets. Each frequency domain signal set comprises the complex values of a plurality of frequency bins.

The meter 101 includes spectral quantification stages 736 coupled to the frequency transform stages 733. The spectral quantification stages 736 are employed to generate spectral quantification sets from each frequency domain signal set. The spectral quantification stages 736 determine the spectral bin amplitudes associated with each frequency-domain signal set and produces a plurality of spectral quantification sets.

The spectral quantification in some embodiments comprises performing power spectral density (PSD) processing on each frequency-domain signal set. The processing may include computing a squared magnitude value from a pair of complex frequency transform values to determine the amplitude of each bin. The processing may include multiplying each complex FFT bin value by its complex conjugate to generate a real squared magnitude value, such as: $\|A+iB\|^2 = (A+iB)(A-iB) = A^2 + B^2$.

The spectral quantification in some embodiments comprises performing magnitude spectral density processing on each frequency-domain signal set. The processing may include computing an absolute magnitude value from a pair of complex frequency transform values to determine the amplitude of each bin. The processing may include squaring an absolute magnitude value for each frequency bin in order to generate a squared magnitude value.

The meter 101 includes a spectral processing block 739 that is coupled to all of the spectral quantification stages 736. The plurality of resulting spectral quantification sets are received and processed in the spectral processing block 739 in order to determine the Doppler reflection offset value, as previously discussed. The Doppler reflection offset value is then used to determine a fluid flow velocity and a fluid flow direction.

In the decimation chain in one embodiment, the data rate may be initially reduced by the signal decimation stages 140 in three successive steps, decimating from 4.8 Msps to 800 ksps, then the analysis scale decimation stages 142 may subsequently successively decimate the 800 ksps signal down to 160 ksps, and finally successively decimating the 160 ksps signal down to 53.3 ksps. There are practical reasons for doing this. First, if the processing system 121 is running at 120 MHz, then a 4.8 MHz sample rate allows only 25 instruction cycles per sample, therefore the sample rate must be reduced to allow for the processing of the data. Second, the FFT bin spacing is given by:

$$\Delta f = \frac{f_s}{N} \quad (1)$$

where $f_s$ is the sampling frequency/rate and N is the FFT size. A 4 Hz frequency resolution might be desirable to estimate the Doppler shift to within 0.1 fps. To achieve a 4 Hz resolution with a 4.8 Msps data rate would require a FFT size of 1,200,000, which is generally impractical.

In some embodiments, each sample rate reduction is accomplished by a bandpass decimator. Although the down-sampling is achieved in the processing system 121 by an appropriate algorithm or routine (accomplished via hardware or software), conceptually each stage implements a bandpass filter to reduce the signal bandwidth, followed by a decimator to lower the sample rate by a factor of M. The sample rates at the decimator input and output are related by:

$$f_{s(out)} = f_{s(in)}/M \quad (2)$$

Because only one of every M output samples is kept, there is no need to compute a new filter output for every input sample and the processing load is thus reduced by a factor of M. In some embodiments, these bandpass filters are symmetric Finite Impulse Response (FIR) filters. If such a filter has length L, then the processing load in millions of instructions per second (MIPS) is:

$$MIPS = \frac{L}{2} \cdot \frac{f_{s(out)}}{10^6} = \frac{L}{2M} \frac{f_{s(in)}}{10^6} \quad (3)$$

In some embodiments, the FIR decimation filters can be chosen to have lengths of 26 taps, 33 taps, and 80 taps respectively. The first two decimation filters may be designed with notches in their transition regions. These notches can be placed to reduce the energy aliased into the Doppler bandwidth of interest.

The third decimation filter can be chosen to have narrow enough transition bands that notches may be unnecessary. This is possible because the low output rate of the third decimator (53.3 ksps) enables a longer FIR filter. The width of a filter's transition band (expressed as a fraction of the filter's input sample rate) is inversely proportional to the filter length L. At the output of the third decimation filter, most of the signal bandwidth is available for the Doppler spectrum and comparatively little is wasted on transition bands and aliasing. If a FFT is computed at this stage, relatively few of the FFT bins will be wasted.

If the power spectral density (PSD) of the Doppler measurement signal prior to decimation is $S_{xx}(f)$, then the PSD, after decimating by a decimation factor M, will be:

$$\tilde{S}_{xx}(f) = \frac{1}{M} \cdot \sum_{n=0}^{M-1} S_{xx}\left(f - n\frac{f_{s(in)}}{M}\right) \quad (4)$$

Equation (4) dictates that decimation will produce M spectral replicas, one of which is in the original position and (M−1) of which are in other places.

Care should be taken that these replicas do not overlap unless they are perfectly aligned. Otherwise, the Doppler spectrum will be corrupted by aliasing. A good strategy is to center the first spectral replica at $f_{s(out)}/4$. If this is done, the other replicas will exactly overlay the first spectral replica. There will also be spectral replicas at $3f_{s(out)}/4$. This spectral positioning is optimal for subsequent bandpass filtering in that it allows the largest (i.e., symmetrical) transition bands. This spectral positioning is obtained when:

$$f_{s(out)} = \frac{4f_o}{2r+1}, r = 0, 1, 2, \ldots \quad (5)$$

where $f_o$ denotes the carrier frequency (the center of the passband). When r is even, the Doppler sidebands retain their original orientation. When r is odd, the Doppler sidebands are mirrored about the carrier position. The r=0 case is oversampled, with the carrier positioned at $f_o=f_s/4$ in the original spectral orientation.

Once the spectral orientation described by equation (5) is achieved, it can be maintained through additional decimation stages by decimating only by factors of 3, 5, 7, and so forth. Choosing M $\in$ {5, 9, 13, . . . } where M is the decimation factor, will preserve the existing spectral orientation. Choosing M $\in$ {3, 7, 11, . . . } as the decimation factor will flip the spectral orientation.

Figure 8:
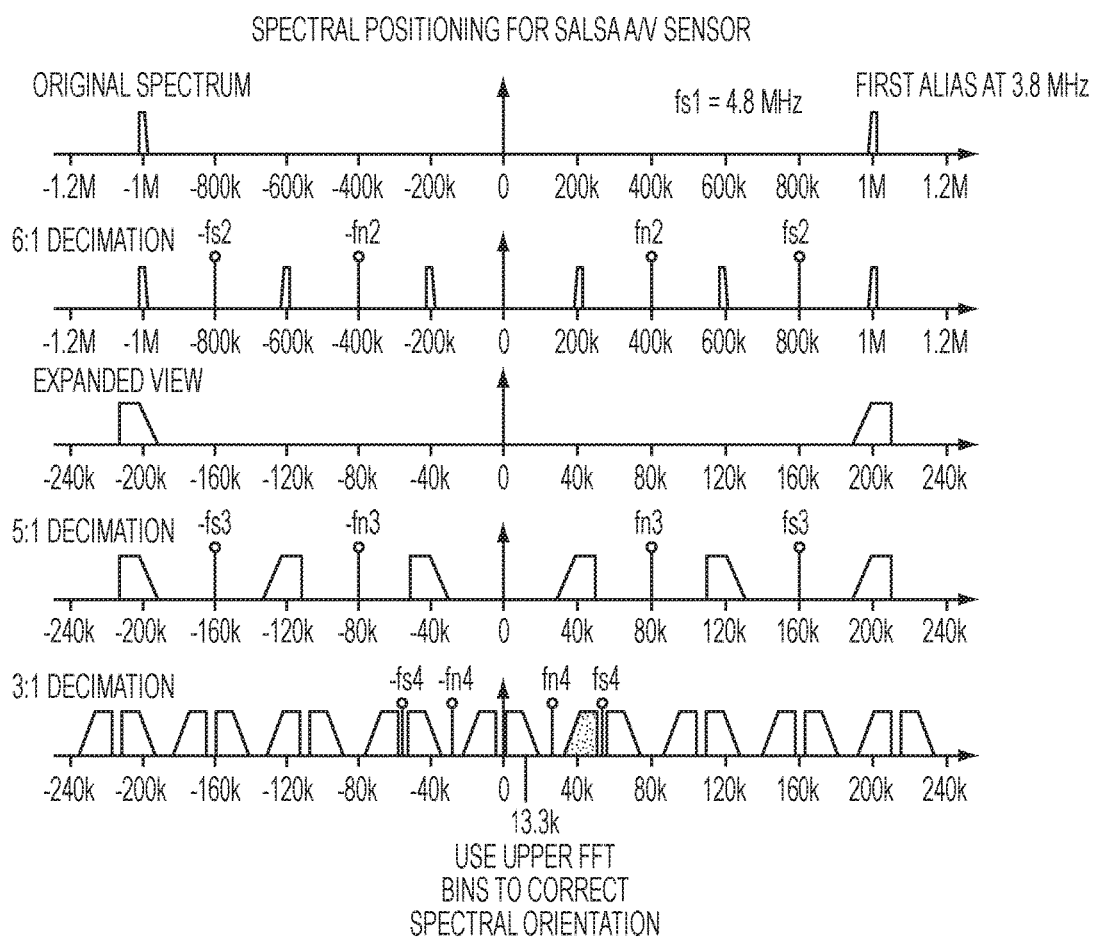
FIG. 8 shows an example of spectral positioning at successive stages of the decimation chain.

FIG. 8 shows the spectral positioning at successive stages of the decimation chain in one embodiment. The Doppler bandwidth of interest has been indicated with an asymmetrical spectral shape. This is for purposes of illustration. Typically only one sideband or the other has significant energy, depending on the flow direction. The first axis shows the original Doppler spectrum, centered about the 1 MHz carrier frequency. Sampling at 4.8 Msps produces spectral aliases at 3.8 MHz, 5.8 MHz, and so on, but these spectral aliases are not visible in the figure. The second axis shows the effect of decimation using a decimation factor of M=6. The Doppler spectrum has been centered about 200 kHz, one quarter of the output sample of 800 ksps. Because this corresponds to r=2 in equation (5), the Doppler spectrum retains its original orientation. An expanded view is shown on axis three.

Axis four shows the result of the second decimation (M=5). The sample rate is reduced from 800 ksps to 160 ksps and a new replica of the Doppler spectrum appears centered at 40 kHz. Finally, the successively-decimated signal is decimated down to 53.3 ksps, as shown on axis five. This decimation nearly fills the available spectral space with the Doppler spectrum of interest. Since the decimation factor M=3, the spectral replica centered at 13.3 kHz is flipped. But there still remains a spectral replica centered at 40 kHz that has the desired orientation. This spectral region can be easily analyzed by using the upper bins of the FFT instead of the lower bins.

Each of the decimation steps shown in FIG. 8 requires bandpass filtering prior to sample rate reduction. This will prevent undesired noise and interference signals from aliasing into the analysis band during the decimation process (these filters are not shown in the figures). The first decimation filter of FIG. 7 is applied to the spectrum shown on axis one. The second decimation filter is applied to the spectrum shown on axis three. The third decimation filter is applied to the spectrum shown on axis four.

If the output of the third and successive decimation filters are used for spectral analysis, then the spectral resolution will be on the order of $2f_{s3}/N$, where N is the FFT length. A spectral resolution of 4 Hz then implies an FFT length greater than 13,000 points. Although this is less than would be required at the original sample rate, it may still be impractical. However, this resolution is not required over the entire Doppler analysis band and is only needed when measuring low velocities. At higher velocities, less resolution is acceptable.

Figure 9:
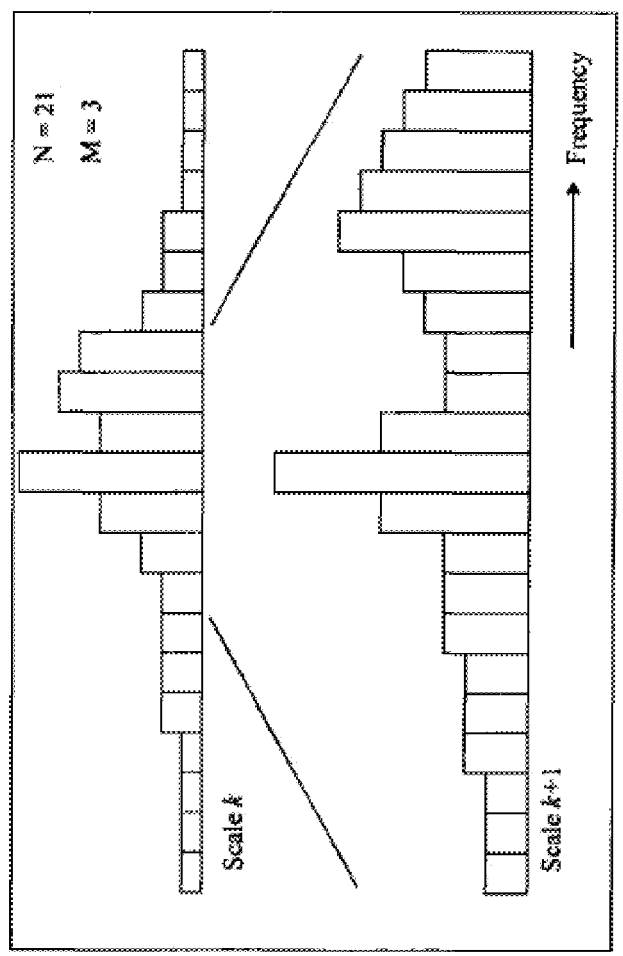
FIG. 9 illustrates an example use of multiple analysis scales to obtain a finer frequency resolution for low Doppler shifts.

FIG. 9 illustrates a use of multiple analysis scales to obtain a finer frequency resolution for low Doppler shifts. The scaling allows both small and large Doppler shifts to be accurately and reliably measured and analyzed. This is done by using successively finer scales to "zoom in" around the carrier frequency. As a result, a Doppler reflection offset value may be obtained as a zoomed centroid (see FIG. 5) that is computed across a plurality of frequency resolution scales. The frequency resolution scales may be distinguished by numbering them and assigning finer scales with higher numbers. Suppose that each finer scale has M times the frequency resolution and 1/M times the frequency span. This allows the same FFT length to be used for each frequency resolution scale. It should be understood that Doppler frequency resolution scales having a broader span may correspondingly include more FFT frames and associated spectral quantification sets that are included in the averaged result of the Doppler reflection offset value. The number of sets averaged may be in proportion to the decimation ratio being used.

Because frequency resolution is inversely proportional to time duration, a FFT at scale k+1 requires M times as long for a fresh data frame to accumulate as does a FFT at scale k. This represents an opportunity. For every FFT processed at scale k+1, M independent FFT frames at scale k can be processed and the resulting power spectral density (PSD) bin amplitudes can be averaged.

Figure 10:
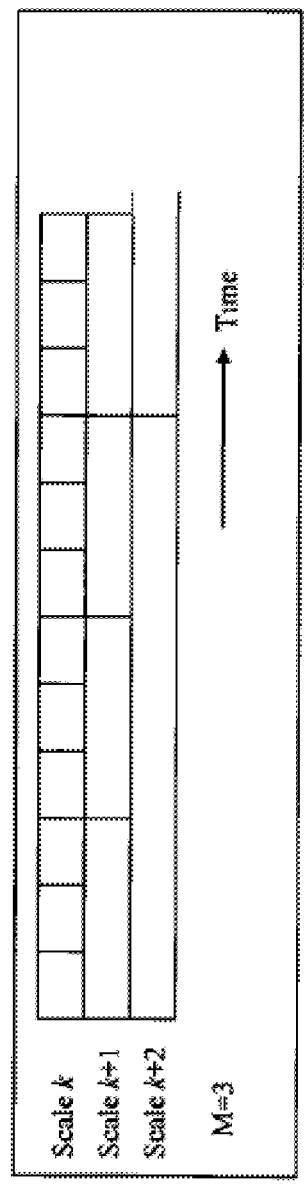
FIG. 10 illustrates an example of partitioning a time interval into different length FFT frames.

FIG. 10 illustrates how the same time interval can be partitioned into different length FFT frames. Due to sample rate reduction from scale to scale, each partition actually uses the same number of data points, so the FFT bin count is the same on all scales.

This averaging will reduce the uncertainty of the scale k FFT bin amplitudes by a factor of $\sqrt{M}$, and the same will be true of the PSD estimates derived from these. It is not necessary to save the individual PSD's in memory, as like-indexed bins can simply be added together as each FFT frame is processed. Dividing the accumulated bin values by one or more factors of M can be accomplished in subsequent calculations.

Averaging successively more FFT frames on each courser scale complicates the scheduling, but pays a valuable dividend. For reasonably broad Doppler peaks, the standard deviation of the estimated mean Doppler shift remains essentially unchanged from one scale to the next. It is very nearly the same as if the finest scale's bin spacing had been used for the entire Doppler range. Yet this can be accomplished with much lower memory requirements.

The trade-off is a lower frequency resolution (wider bins) on coarser scales. But as a practical matter, a velocity of 25 fps does not need to be known to within 0.05 fps—knowing it to within 0.25 fps is perfectly adequate.

To demonstrate this idea, assume M=5 and suppose that the Doppler peak has an effective width of 15 bins on the finest available analysis scale. Let the PSD bin amplitudes have an uncertainty of U. Then the uncertainty in a centroid calculated on this scale is proportional to $U/\sqrt{15}$. Now suppose the next coarser scale is used, which has 5 times the frequency range and correspondingly wider bins. The same Doppler peak now occupies only 3 bins. The amplitude uncertainty would ordinarily be proportional to $U/\sqrt{3}$, but by averaging five PSD estimates it instead becomes proportional to $U/(\sqrt{5}\sqrt{3})=U/\sqrt{15}$. This is same result as on the finer scale, but if a single scale were made to cover the entire Doppler range (while maintaining the same frequency resolution near carrier), a FFT of length five times as long would have been needed. To cover the same range as an instrument using three zoomed analysis scales would require a FFT twenty-five times as long.

Figure 11:
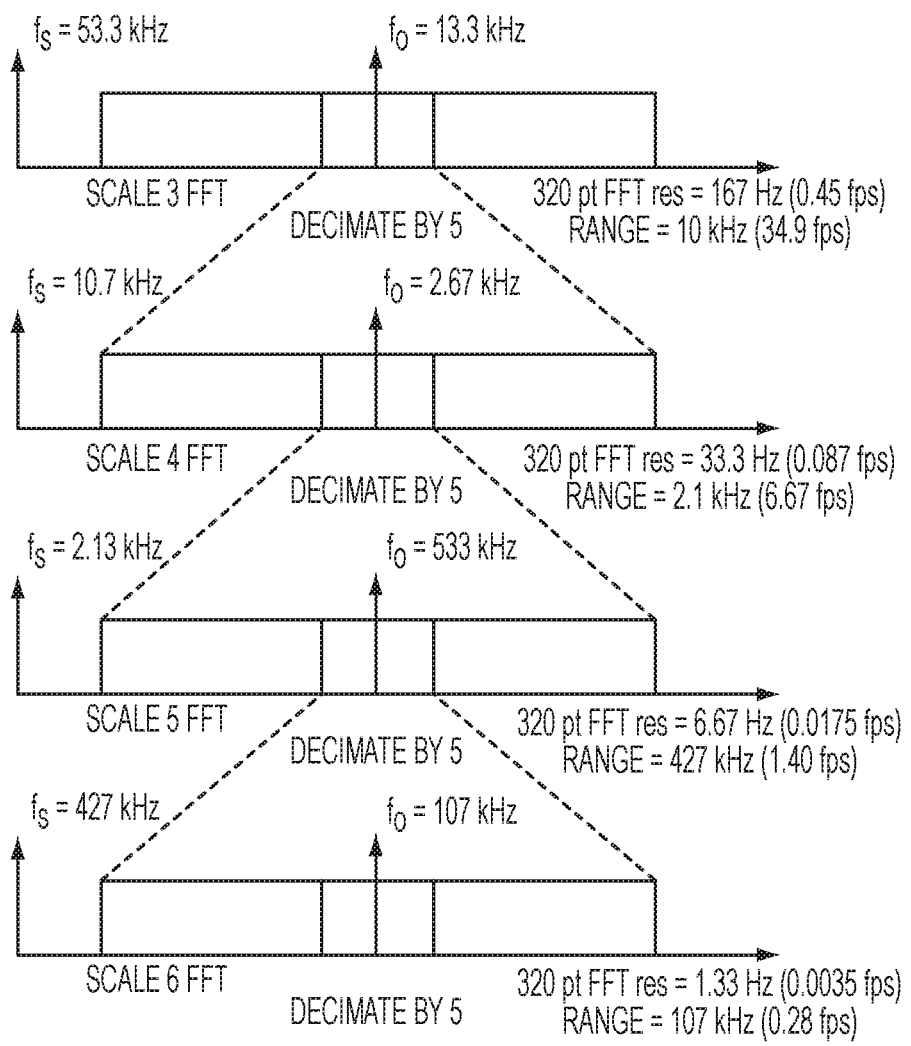
FIG. 11 shows an example zoomed FFT hierarchy.

FIG. 11 shows a zoomed FFT hierarchy according to the invention. The Doppler measurement instrument 100 is configured to perform multiple decimation steps and compute FFT's at several different scales. This results in the zoomed FFT hierarchy. Note that a 320 point FFT may be used instead of a more common power-of-two size. Because 320 is a multiple the decimation factor, five FFT bins on a given scale map directly to a single FFT bin on the next coarser scale. This facilitates computations across multiple scales. Upper-scale FFT frames happen five times as often and these FFTs can be averaged.

Before each decimation indicated in FIG. 9, the outermost parts of the Doppler spectrum must be suppressed at the previous scale. Because the unwanted spectral regions may have significant energy content, a good bandpass filter is required. Fortunately, these analysis scales are operating at low enough sample rates to make this feasible.

The apparatus and method according to any of the embodiments of the invention improve Doppler flow measurements by producing a more accurate velocity measurement from a Doppler measurement signal. The Doppler measurement instrument and processing method according to some embodiments of the invention implements a larger portion of the signal processing in software, instead of in hardware. This results in a simpler and smaller physical hardware and a lower cost velocity meter. The Doppler measurement instrument and processing method offers a reduced power consumption through implementing a greater portion of the signal processing in a processor or processor system, instead of spread over a variety of discrete components. The Doppler measurement instrument and processing method offers an increased measurement accuracy at extremes of velocity measurement. The Doppler measurement instrument and processing method attains high accuracy at low target velocities by achieving a fine frequency resolution. The Doppler measurement instrument and processing method attains high accuracy at high target velocities by averaging multiple spectral quantification frames. The Doppler measurement instrument and processing method offers very low through very high target velocity measurements without requiring high sampling rates at low velocities. The Doppler measurement instrument and processing method offers very low through very high target velocity measurements without requiring long processing times at high velocities. The Doppler measurement instrument and processing method avoids aliasing at low sampling frequencies.

The Doppler measurement instrument and processing method offers a fine frequency resolution at low Doppler shifts. However, the Doppler measurement instrument and processing method does not require or impose the sampling and processing load of a fine frequency resolution at high Doppler shifts. Instead, it benefits from averaging more FFT frames.

At higher Doppler shifts, the Doppler measurement instrument and processing method provides better statistical variance by using shorter FFTs, wherein successive spectral densities are averaged. If the instrument and method processes and averages substantially all FFT frames, then the statistical risk is reduced.

Velocity may be determined from one centroid chosen by the algorithm. Alternatively, velocity may be determined from a "zoomed" centroid calculated using information from several analysis scales. The method of calculating a zoomed centroid will now be taught.

In calculating the zoomed centroid, assume that two-sided spectra are available at multiple analysis scales, where successively higher-numbered scales have successively finer frequency resolution around the carrier position, $f_0$. It is desired to compute a centroid estimate in which spectral data is integrated from two or more analysis scales in a consistent fashion. It is illustrative to consider the case of two successive scales, designated as scale k and k+1, with the latter having a finer resolution near the carrier. If access is available to continuous spectral estimates, the computation could be:

$$\bar{f} = \frac{\int_{f_0-f_{splice}}^{f_0-f_{max}}(f-f_0)S_k(f-f_0)df + \int_{f_0-f_{splice}}^{f_0+f_{splice}}(f-f_0)S_{k+1}(f-f_0)df + \int_{f_0+f_{splice}}^{f_0+f_{max}}(f-f_0)S_k(f-f_0)df}{\int_{f_0-f_{splice}}^{f_0-f_{max}}S_k(f-f_0)df + \int_{f_0-f_{splice}}^{f_0+f_{splice}}S_{k+1}(f-f_0)df + \int_{f_0+f_{splice}}^{f_0+f_{max}}S_k(f-f_0)df} \quad (6)$$

In the equation above, the finest-resolution spectral estimate is being used, $S_{k-1}(f)$, in the vicinity of the carrier and the coarser estimate, $S_k(f)$, is used at Doppler shifts beyond $f_{splice}$. In this way, a wider Doppler range is able to be considered while still obtaining fine resolution near the carrier. This is why it is called a "zoomed centroid". A calculation across three or more scales is an obvious extension.

Considering discrete bin amplitudes will expose some subtleties. Suppose each scale is derived from the previous scale using a decimation factor of M. Then the bin widths of successive scales are related by $$\Delta f_{k+1} = \Delta f_k / M \quad (7)$$

and a PSD bin of scale k represents M times as much Doppler return energy as a bin of scale k+1 having equal amplitude.

But if the bin amplitudes on scale k come from summing M times as many PSD frames as are summed on scale k+1, then bin amplitudes on scale k are actually M times too large. This factor of M cancels the previous factor. But it may be that there are other factors to consider when moving between scales. Perhaps the decimation filter has non-unity gain, for instance. The PSD bin amplitudes would then change by the square of this gain. All such factors must be accounted for when computing multi-scale centroid estimates.

A two-scale zoomed centroid calculation for scales k and k+1 will then look like:

$$\bar{f} = \Delta f_k \cdot \frac{G_k \sum_{n=p_k}^{N/2-1} n \cdot [A_k(n) - A_k(-n)] + \frac{G_{k+1}}{M} \sum_{n=1}^{q_{k+1}} n \cdot [A_{k+1}(n) - A_{k+1}(-n)]}{G_k \sum_{n=p_k}^{N/2-1} |A_k(n) - A_k(-n)| + \frac{G_{k+1}}{M} \sum_{n=1}^{q_{k+1}} |A_{k+1}(n) - A_{k+1}(-n)|} \quad (8)$$

in which $A_k(n)$ denotes the PSD amplitude of the nth bin at scale k, and $G_k$ is the appropriate bin amplitude factor for scale k.

Figure 12:
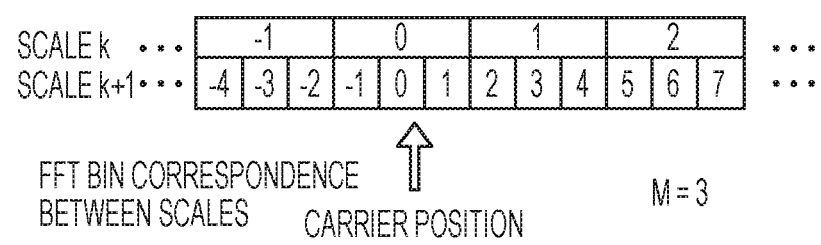
FIG. 12 shows example bins that are indexed beginning with zero at the carrier wave position.

FIG. 12 shows bins that are indexed beginning with zero at the carrier wave position. In the previous equation, the lower summation limit for scale k is $p_k$, and the upper summation limit for scale k+1 is $q_{k+1}$. There is a factor of M difference in bin widths between scales, so the splice indices must also differ by a factor of M between scales. It can be seen that if the coarser scale accumulation leaves off at index$\pm p_k$, the accumulation on the finer scale must continue towards carrier at $\pm q_{k+1}$, where:

$$q_{k+1} = M \cdot p_k - \left\lfloor \frac{M}{2} \right\rfloor - 1 \quad (9)$$

For example, if M=3, as in FIG. 12, then terminating the scale k summation at $p_k=2$ means that the scale k+1 summation must continue at $q_{k+1}=4$ There are some additional restrictions on the splice indices. It is assumed that each scale has a total of N frequency bins and that N is a factor of 4. The carrier bin is assigned an index of 0. If the carrier is positioned at fs/4, then bin N/2 is a "Nyquist bin". If the carrier is positioned at 3 fs/4, then bin N/2 is a "DC bin". Either way, it has no mirror image and must not be used. Therefore, the maximum permitted value of n on any scale is N/2-1.

Substituting this limit in the previous formula yields the requirement $$p_k \le \frac{N}{2M} \quad (10)$$

on all but the finest scale. This prevents running past the edges of the next finer scale. On the finest scale, the minimum permitted index is 0, but it is pointless to use this in the formulas, so in practice the limit is 1.

Now consider the more general case of a zoomed centroid computation done over m scales, beginning with scale k. The resulting centroid estimate may be written:

$$\bar{f} = \Delta f_k \cdot \frac{\sum_{i=0}^{m-1} \frac{G_{k+i}}{M^i} \cdot D_{k+i}}{\sum_{i=0}^{m-1} \frac{G_{k+i}}{M^i} \cdot E_{k+i}} \quad (11)$$

Where:

$$D_j = \sum_{n=p_j}^{q_j} n \cdot [A_j(n) - A_j(-n)] \quad (12)$$

and:

$$E_j = \sum_{n=p_j}^{q_j} |A_j(n) - A_j(-n)| \quad (13)$$

Each $D_j$ is a partial sum of frequency-weighted bin amplitudes taken from scale j. Each $E_j$ is the net asymmetric energy in those same bins. The summation limits preclude counting the same spectral energy on more than one scale.

To make the results of these general formulas match the two-scale formula presented earlier, identify $q_k=N/3-1$ and $p_{k+m-1}=1$. This causes the aggregate summations to range from bins$\pm(N/2-1)$ at the outsides of the coarsest scale to bins$\pm 1$ at the middle of the finest scale.

The zoomed centroid formulas given above have been stated for the case of an instrument capable of analyzing two-sided Doppler spectra. They are easily adaptable to one-sided instruments by using only spectral or bin amplitudes to the right of carrier, and taking those amplitudes to the left of carrier to be zero.

Regarding the zoomed centroid estimate given above, choosing a different set of splice points $\{p_i, q_i\}$ will generally result in a slightly different value of $\bar{f}$. This is due to underlying uncertainties in the bin amplitudes causing slight differences between scales. It is a fact of periodogram-based spectral estimation that the uncertainty in any particular bin amplitude estimate is proportional to the bin's true amplitude. This means that the sensitivity of $\bar{f}$ to small changes in the splice point locations can be minimized by splicing where the bin amplitudes (on both sides of carrier) are low. If this is impossible, the next best thing is to splice where the right-left difference |A(n)-A(-n)| is small.

There is another advantage to splicing at a spectral low point; it reduces potential double-counting of spectral energy near the splice location. It is a property of the periodogram that its bin amplitudes are orthogonal to one another. So, on any particular scale, no spectral energy is ever double-counted. Unfortunately, this property is not preserved across scale boundaries. There could be a bit of redundant spectral leakage into the first few bins of the finer scale. This represents a potential bias, but it can be minimized if splice point are chosen where the spectral bin amplitudes (or their right-left differences) are small.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments have been described herein, it is to be understood that the embodiments are not limited to those precise embodiments, and that various other changes and modifications may be affected therein by one skilled in the art without departing from the scope or spirit of the disclosure.

What is claimed is:

1. A fluid flow measurement instrument, comprising:
  a sensor configured to measure a fluid flowing within a fluid channel, said sensor:
    emitting a signal towards or into the fluid; and
    producing a time domain signal representative of reflections of the emitted signal; and
  a meter coupled to the sensor and comprising a processing system that is configured to:
    receive the time domain signal;
    successively decimate the time domain signal to generate a series of time domain decimated signal sets, wherein each successive decimation stage comprises a replica of a previous decimation stage and has an output sample rate lowered by a decimation factor;
    thereafter compute a frequency transform for one or more of the series of time domain decimated signal sets, wherein each frequency transform provides a spectral quantification set having a different frequency resolution;
    average spectral quantification sets associated with a frequency range to produce spectral estimates;
    compute therefrom one or more frequency offset values; and provide a fluid flow velocity estimate based upon the one or more frequency offset values so obtained.

2. The fluid flow measurement instrument of claim 1, wherein the meter is configured to produce spectral estimates of differing frequency range and resolution,
   wherein a spectral estimate on a particular analysis scale has the narrowest frequency range and the finest resolution; and
   wherein spectral estimates on another analysis scale are obtained by processing more frames of time series data.

3. The fluid flow measurement instrument of claim 2, wherein at all frequency resolution scales, a frequency transform of the same length is used.

4. The fluid flow measurement instrument of claim 2, wherein the spectral estimates are used to form a zoomed centroid for determining a frequency offset value and computing therefrom the fluid flow velocity estimate.

5. The fluid flow instrument of claim 2, wherein one or more of the spectral estimates are used to score another spectral estimate.

6. The fluid flow measurement instrument of claim 1, wherein the meter is further configured to filter and window time domain decimated signal sets.

7. The fluid flow measurement instrument of claim 1, wherein a spectral quantification set comprises a plurality of frequency bins.

8. The fluid flow measurement instrument of claim 1, wherein the averaged spectral quantification sets comprise a plurality of spectral estimates that are processed to:
   generate a spectral centroid from each spectral estimate, wherein each spectral centroid comprises an offset value for the corresponding spectral estimate; and
   generate the frequency offset value from one or more spectral centroids.

9. The fluid flow measurement instrument of claim 1, wherein the averaged spectral quantification sets comprise a plurality of spectral estimates that are processed to:
   generate a zoomed centroid from the plurality of spectral estimates; and
   generate the frequency offset value from the zoomed centroid.

10. The fluid flow measurement instrument of claim 1, wherein to successively decimate comprises single-phase bandpass decimating of the time domain signal to produce a plurality of two-sided Doppler spectra.

11. A fluid flow measurement method, comprising:
   emitting, from a sensor configured to measure a fluid flowing within a fluid channel, a signal towards or into the fluid;
   producing a time domain signal representative of reflections of the emitted signal;
   successively decimating the time domain signal to generate a series of time domain decimated signal sets, wherein each successive decimation stage comprises a replica of a previous decimation stage and has an output sample rate lowered by a decimation factor;
   thereafter computing a frequency transform for one or more of the series of time domain decimated signal sets, wherein each frequency transform provides a spectral quantification set having a different frequency resolution;
   averaging spectral quantification sets associated with a frequency range to produce spectral estimates;
   computing therefrom one or more frequency offset values; and
   providing a fluid flow velocity estimate based upon the one or more frequency offset values so obtained.

12. The fluid flow measurement method of claim 11, further comprising operating the meter to:
   produce spectral estimates of differing frequency range and resolution,
   wherein a spectral estimate on a particular analysis scale has the narrowest frequency range and the finest resolution; and
   wherein spectral estimates on another analysis scale are obtained by processing more frames of time series data.

13. The fluid flow measurement method of claim 12, further comprising operating the meter to form a zoomed centroid using the spectral estimates;
   wherein the zoomed centroid is used for determining a frequency offset value and computing therefrom the fluid flow velocity estimate.

14. The fluid flow measurement method of claim 11, further comprising operating the meter to:
   generate a spectral centroid from each spectral estimate, wherein each spectral centroid comprises an offset value for the corresponding spectral estimate; and
   generate the frequency offset value from one or more spectral centroids.

15. A program product for fluid flow measurement, comprising:
   a non-transitory, device readable program storage device storing device readable program code, the device readable program code being executable by a processor and comprising:
   device readable program code configured to emit, from a sensor configured to measure a fluid flowing within a fluid channel, a signal towards or into the fluid;
   device readable program code configured to produce a time domain signal representative of reflections of the emitted signal;
   device readable program code configured to successively decimate the time domain signal to generate a series of time domain decimated signal sets, wherein each successive decimation stage comprises a replica of a previous decimation stage and has an output sample rate lowered by a decimation factor;
   device readable program code configured to thereafter compute a frequency transform for one or more of the series of time domain decimated signal sets, wherein each frequency transform provides a spectral quantification set having a different frequency resolution;
   device readable program code configured to average spectral quantification sets associated with a frequency range to produce spectral estimates;
   device readable program code configured to compute therefrom one or more frequency offset values; and
   device readable program code configured to provide a fluid flow velocity estimate based upon the one or more frequency offset values so obtained.

* * * * *